United States Patent
Tembey et al.

(10) Patent No.: US 9,661,440 B2
(45) Date of Patent: May 23, 2017

(54) METHODS AND SYSTEMS FOR TRIGGERING EFFICIENT APPLICATION SYNCHRONIZATION

(71) Applicant: QUALCOMM Incorporated, San Diego, CA (US)

(72) Inventors: Priyanka Tembey, Mountain View, CA (US); Saumitra Mohan Das, Santa Clara, CA (US); Dilma Da Silva, San Jose, CA (US); Vrajesh Bhavsar, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/465,693

(22) Filed: Aug. 21, 2014

(65) Prior Publication Data

US 2016/0029146 A1  Jan. 28, 2016

Related U.S. Application Data

(60) Provisional application No. 62/029,278, filed on Jul. 25, 2014.

(51) Int. Cl.
*H04W 36/36* (2009.01)
*H04W 4/00* (2009.01)
(Continued)

(52) U.S. Cl.
CPC ......... *H04W 4/003* (2013.01); *H04L 67/1095* (2013.01); *H04W 4/001* (2013.01);
(Continued)

(58) Field of Classification Search
CPC .......................... H04W 36/30; H04W 36/0011
(Continued)

(56) References Cited

U.S. PATENT DOCUMENTS 7,024,214 B2 * 4/2006 Loveland ............ H04L 67/1095
  370/350
7,987,471 B2   7/2011 Herzog et al.
(Continued)

FOREIGN PATENT DOCUMENTS

WO   WO-2013106711 A1   7/2013
WO   WO-2013187892 A1   12/2013

OTHER PUBLICATIONS

International Search Report and Written Opinion—PCT/US2015/038081—ISA/EPO—Sep. 8, 2015.

*Primary Examiner* — Kevin Kim
(74) *Attorney, Agent, or Firm* — Haynes and Boone, LLP

(57) ABSTRACT

An example method of synchronizing application data between a mobile device and a remote computing device includes for each network of one or more networks, collecting network data regarding a mobile device's current connectivity state to the respective network. The mobile device includes one or more mobile applications including application data. The method also includes detecting, at the mobile device, a current connection to a current network. The method further includes comparing one or more opportunity scores for synchronizing application data. The one or more opportunity scores includes an opportunity score for the current network. Each opportunity score is associated with a particular network. The method also includes determining, based on the comparing, whether the current network is a good opportunity network for syncing mobile application data.

30 Claims, 5 Drawing Sheets

(51) Int. Cl.
  *H04L 29/08* (2006.01)
  *H04W 8/18* (2009.01)
  *H04W 8/30* (2009.01)

(52) U.S. Cl.
  CPC ............ *H04W 8/183* (2013.01); *H04L 67/32* (2013.01); *H04W 8/30* (2013.01)

(58) Field of Classification Search
  USPC ........................................ 455/437, 438, 439
  See application file for complete search history.

(56) References Cited

U.S. PATENT DOCUMENTS

| | | |
|---|---|---|
| 8,386,558 B2 | 2/2013 | Schleifer et al. |
| 8,626,906 B1 | 1/2014 | Chan |
| 8,634,341 B1 | 1/2014 | Vleugels et al. |
| 2004/0159779 A1* | 8/2004 | Duff ...................... G06F 3/0202 250/221 |
| 2008/0081605 A1 | 4/2008 | Cole |
| 2012/0196644 A1 | 8/2012 | Scherzer et al. |
| 2014/0056153 A1 | 2/2014 | Monnes et al. |
| 2015/0350875 A1 | 12/2015 | Chhabra et al. |

* cited by examiner

METHODS AND SYSTEMS FOR TRIGGERING EFFICIENT APPLICATION SYNCHRONIZATION

CROSS REFERENCE TO RELATED APPLICATIONS

This application claims the benefit of priority from U.S. provisional patent application No. 62/029,278, filed Jul. 25, 2014, which is incorporated by reference.

FIELD OF DISCLOSURE

The present disclosure generally relates to data transmission over a network, and more particularly to synchronizing application data between computing devices.

BACKGROUND

Mobile devices are ubiquitous and may include a smartphone, tablet, portable digital assistant (PDA), portable game console, palmtop computer, and other portable electronic devices. In addition to the primary function of these devices, many include peripheral functions. For example, a smartphone may include the primary function of making telephone calls and the peripheral functions of playing a game, a still camera, a video camera, global positioning system (GPS) navigation, web browsing, and sending and receiving emails.

Applications may be installed on the mobile device to provide these peripheral functions. In an example, an application is provided by a third party, and a user may download the application onto the mobile device. In another example, the user receives the mobile device with an application already installed on the mobile device. A mobile application may sync with a remote server by transferring data to and/or receiving data from the remote server. For example, a user may upload photos or a video to the remote server using a mobile application. In such an example, hundreds or thousands of megabytes of data may be transferred to a backend service. Even though the data transfer may be performed in the background, the data transfer may be data heavy and time-consuming. Additionally, as the time it takes to sync the mobile application increases, the processing power required to support such functionality also increases.

BRIEF SUMMARY

This disclosure relates to data transmission over a network. Methods, systems, and techniques for synching application data are provided.

According to some embodiments, a method of synchronizing application data between a mobile device and a remote computing device includes for each network of one or more networks, collecting network data regarding a mobile device's current connectivity state to the respective network. The mobile device includes one or more mobile applications including application data. The method also includes detecting, at the mobile device, a current connection to a current network. The method further includes comparing one or more opportunity scores for synchronizing application data. The one or more opportunity scores include an opportunity score for the current network. Each opportunity score is associated with a particular network. The method also includes determining, based on the comparing, whether the current network is a good opportunity network for syncing mobile application data.

According to some embodiments, a system for synchronizing application data between a mobile device and a remote computing device includes a network metrics logger that detects a current connection between a mobile device and a current network and that for each network of one or more networks, collects network data regarding a mobile device's current connectivity state to the respective network. The mobile device includes one or more mobile applications including application data. The system also includes an opportunity learning engine that compares one or more opportunity scores for synchronizing application data and determines, based on the comparing, whether the current network is a good opportunity network for syncing mobile application data. The one or more opportunity scores include an opportunity score for the current network. Each opportunity score is associated with a particular network.

According to some embodiments, a computer-readable medium has stored thereon computer-executable instructions for performing operations including: for each network of one or more networks, collecting network data regarding a mobile device's current connectivity state to the respective network, where the mobile device includes one or more mobile applications including application data; detecting, at the mobile device, a current connection to a current network; comparing one or more opportunity scores for synchronizing application data, the one or more opportunity scores including an opportunity score for the current network, and wherein each opportunity score is associated with a particular network; and determining, based on the comparing, whether the current network is a good opportunity network for syncing mobile application data.

According to some embodiments, an apparatus for synchronizing application data between a mobile device and a remote computing device includes means for, for each network of one or more networks, collecting network data regarding a mobile device's current connectivity state to the respective network, where the mobile device includes one or more mobile applications including application data. The apparatus also includes means for detecting, at the mobile device, a current connection to a current network. The apparatus further includes means for comparing one or more opportunity scores for synchronizing application data, the one or more opportunity scores including an opportunity score for the current network, and wherein each opportunity score is associated with a particular network. The apparatus also includes means for determining, based on the comparing, whether the current network is a good opportunity network for syncing mobile application data.

According to some embodiments, a method of synchronizing application data between a mobile device and a remote computing device includes determining whether to synchronize application data over a mobile device's current connection to a first network. The mobile device includes one or more mobile applications including application data. The method also includes comparing a plurality of opportunity scores including an opportunity score for the first network and an opportunity score for a second network. The mobile device has been previously connected to the second network. Each opportunity score is associated with a particular network and is based one or more feature sets of the particular network. The method further includes determining, based on the comparison of the plurality of opportunity scores, whether to schedule a mobile application data sync.

In an example, the first network is of a first type and the second network is of a second type that is different from the first type. In such an example, a first opportunity score that is associated with the first network of the first type and a second opportunity score that is associated with the second network of the second type may be compared. Accordingly, opportunity scores that are associated with different network types may be compared. In another example, the first network and the second network are of a common network type and have different feature set values for a feature set. In such an example, a first opportunity score and a second opportunity score that are associated with the common network type are compared. Accordingly, opportunity scores that are associated with the same network type may be compared.

According to some embodiments, a system for synchronizing application data between a mobile device and a remote computing device includes a synchronization manager that determines whether to synchronize application data over a mobile device's current connection to a first network. The mobile device includes one or more mobile applications including application data. The synchronization manager compares a plurality of opportunity scores including an opportunity score for the first network and an opportunity score for a second network. The mobile device has been previously connected to the second network. Each opportunity score is associated with a particular network and is based one or more feature sets of the particular network. The synchronization manager determines, based on the comparison of the plurality of opportunity scores, whether to schedule a mobile application data sync.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
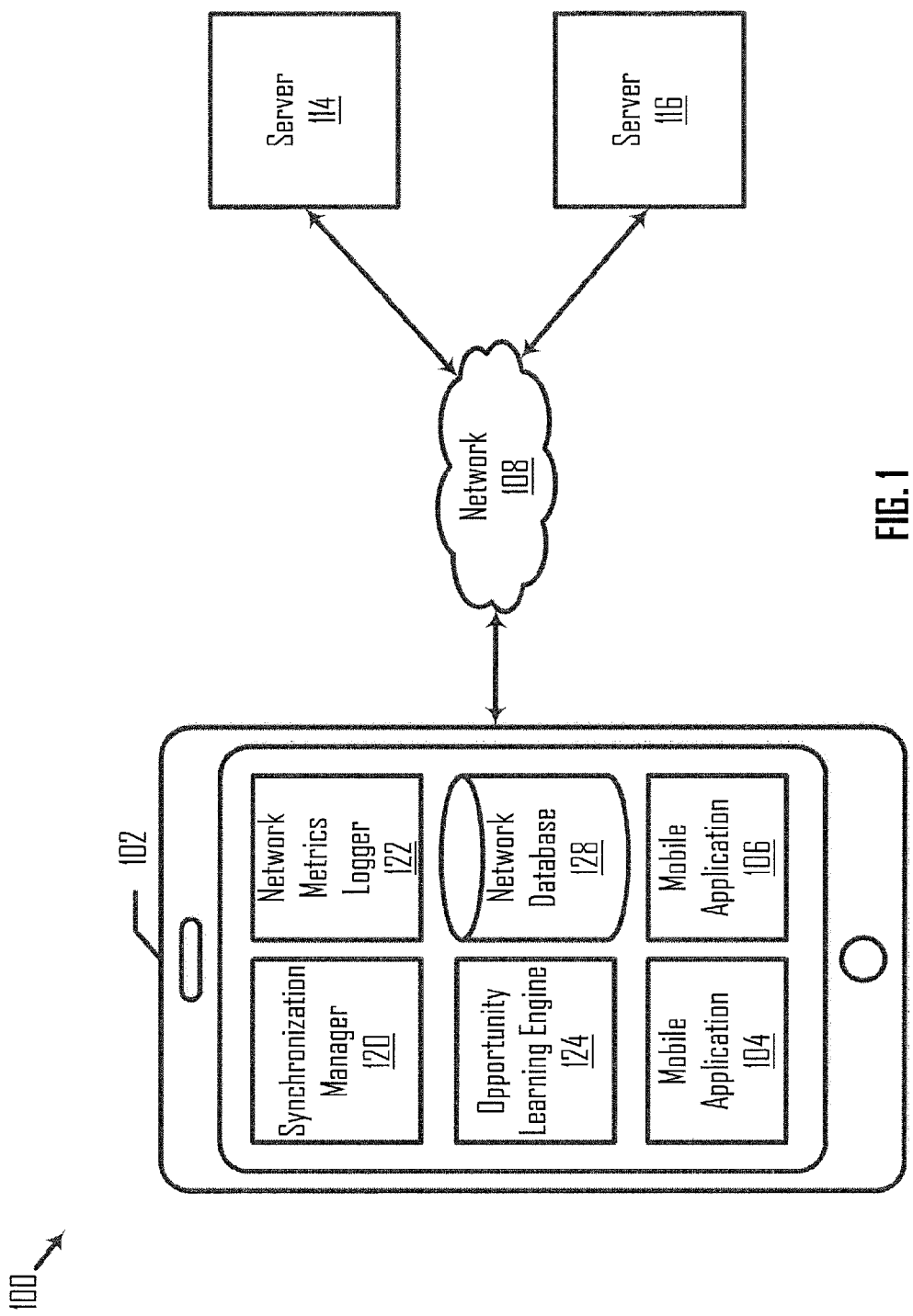
FIG. 1 is a block diagram illustrating a system for synchronizing application data between a mobile device and a remote computing device, according to some embodiments.

I. Overview
II. Example System Architecture
   A. Collect Network Data
   B. Learn Via Connectivity History
     1. Calculate Opportunity Score
     2. Compare Opportunity Scores to Identify Good Opportunity Networks
III. Determine Whether to Sync the Mobile Application
   A. Do Not Sync the Mobile Application
   B. Sync the Mobile Application
IV. User Inputs
V. Example Methods
VI. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Mobile applications connected to the cloud are increasingly commonplace. A mobile device may include a synchronization manager that synchronizes (syncs) mobile applications installed on the mobile device with remote servers. Current sync schedules are mostly network agnostic and check only whether the mobile device is connected to a Wi-Fi or cellular network. A Wi-Fi network and cellular network are different types of networks.

The synchronization manager may synch one or more mobile applications when, for example, the mobile device is connected to a Wi-Fi® network. Trademarks are the properties of their respective owners. The synchronization manager may also provide the user with an option to sync mobile applications over Wi-Fi rather than a cellular network. By using Wi-Fi to sync a mobile application, the user may save over her data plan. The synchronization manager does not typically take into account particular features of the Wi-Fi (e.g., type of Wi-Fi link) or cellular network connection, and these features may be helpful to determine whether it is a good time for synching application data.

Application data transfer may be improved by learning about the mobile device's connectivity state over time for Wi-Fi and cellular connections. For example, it may be desirable to characterize networks to which the mobile device connects and take into account particular features of the network (e.g., Wi-Fi or cellular network) to determine whether to sync a mobile application over the network or whether to delay the sync until the application is connected to another network. For example, it may be advantageous to consider the Wi-Fi link type, Wi-Fi backhaul characteristics, cellular link type, and data plan, etc. when determining whether to sync the mobile application.

Additionally, it may be unnecessary for some data transfers (e.g., application data synchs) to be done in real-time. Such data transfers may be delay tolerant (e.g., uploading photos to a website) and performed at a later point in time. It may be desirable to schedule mobile application synchs between a mobile device and a remote computing device at opportune times of good network connectivity. In this way, performance may be improved. Additionally, mobile device power expended in performing mobile application synchs may be optimized. As such, helping mobile applications leverage good network conditions may be beneficial for power and performance of data transfer.

The present disclosure provides techniques to improve mobile application data transfer by learning about the mobile device's network connectivity state over time. Rather than only determining whether to synch the mobile application based on the current network connection, "long-term" network data collected over a time period may be used to make this determination. Scheduling synchs at opportune times of good network connectivity can help improve the mobile device's performance and optimize power, thus reducing the expenditure in performing the synch.

II. Example System Architecture

FIG. 1 is a block diagram 100 illustrating a system for synchronizing application data between a mobile device and one or more remote computing devices, according to some embodiments. FIG. 1 includes a mobile device 102 that is capable of executing a client application and storing application data. A mobile device may refer to a non-stationary computing device. Mobile device 102 may be, for example, a smartphone, tablet, laptop, or personal digital assistant. In an example, mobile device 102 is an Android® device that is installed with the Android® mobile operating system.

Mobile device 102 may include one or more mobile applications that may include application data. A user of mobile device 102 may download one or more mobile applications provided by a service provider onto his or her mobile device. A mobile application is a software program that may be downloaded and accessed directly via the mobile device. A mobile application may be represented by an icon on a display of mobile device 102, and the user may select the mobile application by touching the icon (e.g., double tapping the icon) to access and interact with the mobile application. Mobile device 102 in this example includes a mobile application 104 and a mobile application 106.

Mobile applications 104 and 106 may be client applications executing on mobile device 102. Mobile device 102 is coupled over a network 108 to a server 114 and a server 116. Servers 114 and 116 are remote from mobile device 102. It may be unnecessary for a mobile application to require constant connectivity to its associated server. For example, a user may interact with mobile application 104 without mobile device 102 being connected to server 114, and a user may interact with mobile application 106 without mobile device 102 being connected to server 116. An application may be deployed to a server and then available for download to a mobile device. In an example, mobile application 104 uses a small, local database on mobile device 102, whose content is a subset of data that is stored at server 114, and mobile application 106 uses a small, local database on mobile device 102, whose content is a subset of data that is stored at server 116.

A mobile application may sync with its associated server by transferring data to and/or receiving data over a network from the server. Mobile device 102 includes a synchronization manager 120 that manages and arbitrates the synching of mobile applications. Synchronization manager 120 may be at the system layer and collect synch requests from mobile applications. Synchronization manager 120 may then schedule the mobile application synchs.

The following is a description of mobile application 104 as it may interact with server 114. This description applies as well to mobile application 106 and server 116. Mobile application 104 may be any mobile application. In an example, mobile application 104 is the Facebook® mobile application, and the user may desire to upload photos onto Facebook®. In another example, mobile application 104 is a music streaming application, and the user may desire to synch a playlist. In another example, mobile application 104 is a calendar application, and the user may desire to synch a calendar. In another example, mobile application 104 is a news application, and the user may desire to retrieve the latest news feed updates.

Synchronization manager 120 may schedule mobile application data synchs between mobile device 102 and a server associated with the mobile application data. For example, mobile application 104 may transfer data to and receive data from server 114 over network 108. In an example, in response to server data at server 114 changing, synchronization manager 120 schedules a synch between mobile application 104 and server 114 so that application data of mobile application 104 is in synch with server data at server 114. In such an example, mobile application 104 may send mobile application data over network 108 to server 114 for storage.

In another example, in response to changes to application data for mobile application 104, synchronization manager 120 schedules a synch between mobile application 104 and server 114 so that server data at server 114 is in synch with application data of mobile application 104. In such an example, server 114 may send application data over network 108 to mobile application 104 for storage. In another example, in response to mobile device 102 sending out a network message to keep the Transmission Control Protocol (TCP)/Internet Protocol (IP) connection alive, synchronization manager 120 schedules a synch between mobile application 104 and server 114. In such an example, the synch may be piggy-backed on the TCP/IP connection. In another example, synchronization manager 120 schedules a synch between mobile application 104 and server 114 periodically (e.g., in response to a time period elapsing). In another example, synchronization manager 120 schedules a synch between mobile application 104 and server 114 in response to a user request to manually synch the mobile application.

A. Collect Network Data

Mobile device 102 includes a network metrics logger 122 that logs network data associated with mobile device 102. Network metrics logger 122 may create a network database 128 in mobile device 102's storage. Network database 128 is local to mobile device 102 and may store a history of mobile device 102's network connections and their state.

Network metrics logger 122 may collect data about current network connectivity of mobile device 102 and store the network data in network database 128. In an example, for one or more networks to which mobile device 102 connects, network metrics logger 122 detects a current connection to the network and collects network data on the mobile device's current connectivity state to the network. Network metrics logger 122 may invoke an application programming interface (API) to collect the network data. In an example, network metrics logger 122 periodically invokes the API (e.g., every one, five, ten, or more seconds) to collect the network data.

The collected network data may include one or more features. A feature may be a network metric that is used to characterize a network. A feature set is a collection of different features that may be used to classify a network. A feature set may include one or more metrics characterizing the network. The feature set may be used in calculating an opportunity score indicating whether a network is a "good opportunity" network or a "bad opportunity" network. A good opportunity network is a network that may provide a good opportunity to sync mobile application data over the network because, in one example, the network is fast. A bad opportunity network is a network that may provide a bad opportunity to sync mobile application over the network because, in another example, the network is slow or another network is known to provide faster data transfer and is more likely to be connected to the mobile device within a threshold time period (e.g., within three hours). An opportunity score may be associated with a network, the score indicating whether to synchronize application data over the network for which the opportunity score is assigned. An opportunity score may be based on one or more feature sets of the particular network.

A feature set may abstract the network type (e.g., Wi-Fi network or cellular network) such that different networks may be compared to each other and their synch opportunities normalized into one metric (e.g., the opportunity score). As such, even though mobile device 102 may connect to different networks with different network metrics, the opportunity score may be used to determine whether one network is better than another for synching mobile application data.

For brevity and simplicity, two "levels" of opportunity scores (e.g., a good opportunity network and a bad opportunity network) are described. This is not intended to be limiting, and other embodiments may have more than two levels of opportunity scores. For example, in another embodiment, a network may be assigned one of three levels of opportunity scores. In such an example, a first level network may be a "good opportunity" network, a second level network may be a "moderate opportunity" network, and a third level network may be a "bad opportunity" network. Opportunity scores are discussed further below.

In an example, network 108 is a Wi-Fi network, and network metrics logger 122 detects a current network connection to the Wi-Fi network. Example features of a Wi-Fi network are signal strength of the Wi-Fi network, service set identifier (SSID) of the Wi-Fi network, media access control (MAC) address and link speed of the access point that allows the mobile device to connect to the Wi-Fi network. In an example, network data for Wi-Fi networks may be ordered based on the SSID of the Wi-Fi network and the MAC address of the access point. Multiple access points may exist within a single SSID. While mobile device 102 is connected to the Wi-Fi network, network metrics logger 122 may log the signal strength and SSID of the network and the MAC address and link speed of the access point device that allows mobile device 102 to connect to the Wi-Fi network into network database 128. In an example, a feature set that classifies an access point with a given MAC address and an SSID includes the given access point's MAC address, the signal strength, SSID, and frequency band of the Wi-Fi network, and the link speed and signal level of the access point that allows mobile device 102 to connect to the Wi-Fi network. This is merely an example, and other feature sets may classify a Wi-Fi network.

In another example, network 108 is a cellular network, and network metrics logger 122 detects a current network connection to the cellular network. Example features of a cellular network are signal strength of the cellular network, network type (e.g., Long-Term Evolution (LTE), Third generation (3G), Fourth generation (4G), and Evolution-Data Optimized (EVDO)), and network name (e.g., Verizon®, Sprint®, and AT&T®). In an example, network data for cellular networks may be ordered based on the type and signal strength of the network. While mobile device 102 is connected to cellular network, network metrics logger 122 may log the signal strength, network type, and network name of the cellular network into network database 128. In an example, a feature set that classifies a given geographic location and cellular network includes the geographic location of the mobile device at the time of the connection, cellular signal strength, network name, and network type. This is merely an example, and other feature sets may classify a cellular network.

Network metrics logger 122 may also log temporal data and spatial data on the mobile device's current network connection (e.g., to the Wi-Fi or cellular network). Mobile device 102 may have different signal strengths in different geographical areas. In an example, network metrics logger 122 normalizes the signal strength. In another example, network metrics logger 122 logs the geographic location of mobile device 102 and the time of the log to distinguish access points and cellular network connections over time and space. In an example, network metrics logger 122 takes into account mobile device 102's proximity to an access point. For example, if mobile device 102 is close to the access point, network metrics logger 122 may recognize a strong signal strength that is captured by the signal strength metric. The signal strength and signal range may vary across different access points, and network metrics logger 122 may capture the state of the signal strength over time. In such an example, the user may roam about the access point and network metrics logger 122 may continue to collect network data to understand the range signal strength metric that can be connected to that particular access point.

Figure 2:
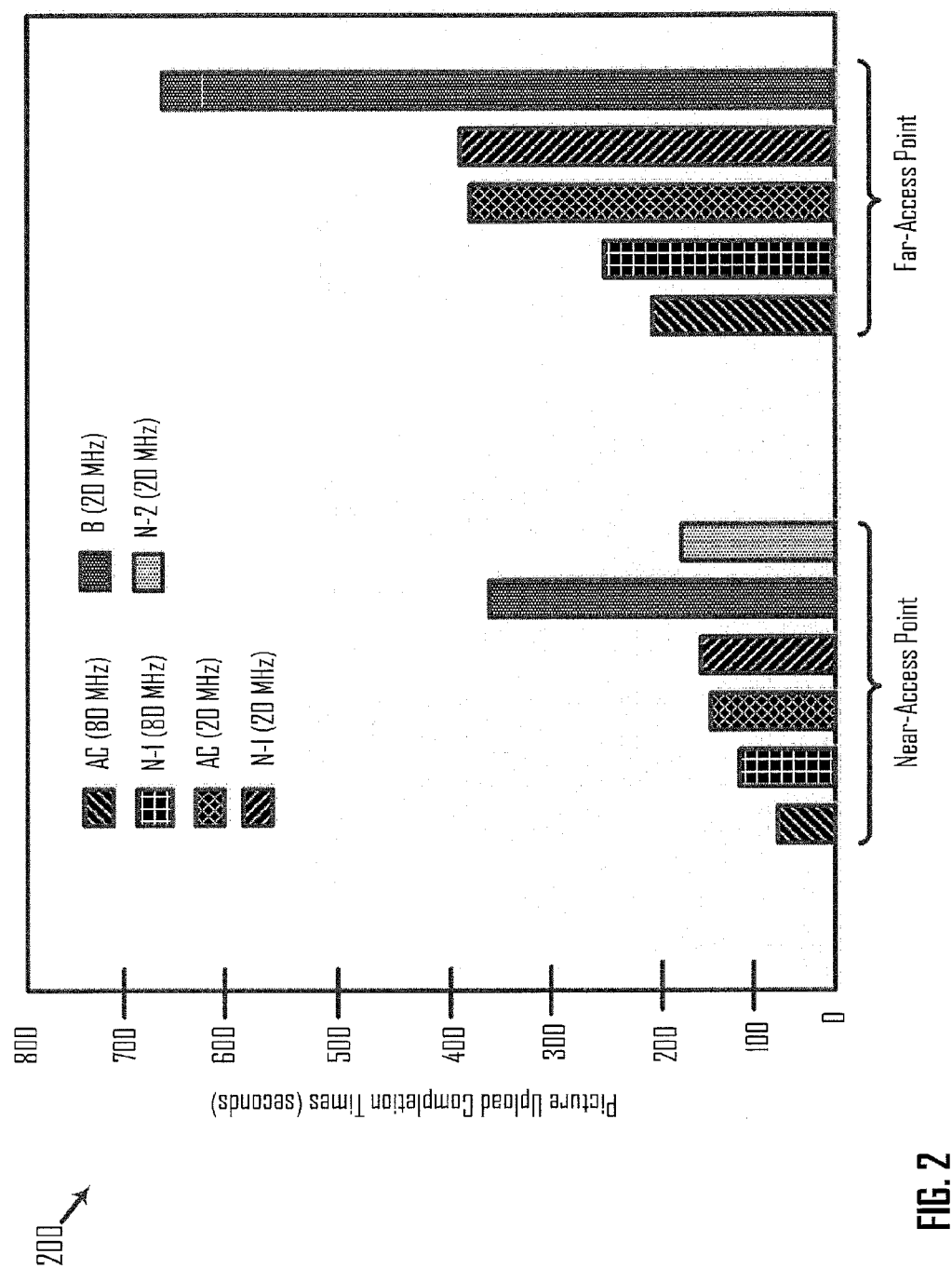
FIG. 2 is an example bar graph of picture upload completion times for different Wi-Fi-based connections.

As discussed, opportunities may vary considerably within and across networks. For example, access points may have different frequency bands and may translate into different opportunities. In an example, a 2.4 GHz (gigahertz) frequency band has relatively no bandwidth compared to a 5.8 GHz frequency band. FIG. 2 is an example bar graph 200 of picture upload completion times for different Wi-Fi-based connections. Bar graph 200 shows the amount of time it takes to upload a photograph to a backend server. An x-axis of bar graph 200 represents the amount of time (in seconds) it takes to upload a picture, and a y-axis of bar graph 200 represents the different types of Wi-Fi networks.

The bars show different opportunities and may represent different Wi-Fi standards (e.g., AC, N-1, and N-2) the access point is configured to across different frequency bands. A left cluster of bar graph 200 illustrates the opportunities associated with mobile device 102 when it is near the access point, and a right cluster of bar graph 200 illustrates the opportunities associated with mobile device 102 when it is far from the access point. If the data transfer is reduced then the total energy expended in performing the data transfer is reduced about the same. For example, in bar graph 200, the AC (80 MHz) Wi-Fi interface completes the picture upload almost 50 percent faster when mobile device 102 is near the access point compared to when mobile device 102 is far from the access point. In such an example, mobile device 102 may expend almost 50 percent less energy synching the mobile application when mobile device 102 is near the access point compared to when mobile device 102 is far from the access point.

Additionally, network metrics logger 122 may process small measurements (e.g., using packet pair or some other routines) to estimate the bandwidth of the current network state or may snoop on an existing data transfer on the link to estimate network bandwidth. Network metrics logger 122 stores the collected network data in network database 128 for opportunity learning engine 124 to analyze.

B. Learn Via Connectivity History

In some embodiments, opportunity learning engine 124 characterizes the one or more networks to which mobile device 102 has connected or to which mobile device 102 is currently connected and learns the connectivity behavior of mobile device 102 from the logged network data.

1. Calculate Opportunity Score

For one or more networks to which mobile device 102 connects, opportunity learning engine 124 may identify a feature set in accordance with the network and calculate an opportunity score for the network. In an example, opportunity learning engine 124 calculates, based on the collected network data for the identified feature set that classifies a network, an opportunity score for the network. Opportunity learning engine 124 may calculate the opportunity score for the network while mobile device 102 is connected to the network of after the network connection has been dropped. The opportunity scores may be calculated based on network data that is collected over a time period (e.g., one week or one month) and may be continuously updated to reflect the mobile device's network connectivity over a period of time. Opportunity learning engine 124 stores the opportunity scores in network database 128, which stores a history of mobile device 102's network connections and their state.

In an example, the feature set that classifies a given Wi-Fi network is the access point's MAC address, the signal strength, SSID, and frequency band of the Wi-Fi network, and the link speed and signal level of the access point that allows mobile device 102 to connect to the Wi-Fi network. In such an example, opportunity learning engine 124 may analyze this feature set to calculate an opportunity score for the given Wi-Fi network. In another example, the feature set that classifies a cellular network includes the geographic location of the mobile device at the time of the connection to the cellular network, cellular signal strength, network name, and network type. In such an example, opportunity learning engine 124 may analyze this feature set to calculate an opportunity score for the given cellular network.

In some embodiments, opportunity learning engine 124 uses regression analysis to calculate the opportunity score. In an example, the calculation of an opportunity score may include deriving a model for throughput and latency observed by one or more applications in a network as a function of the network feature sets collected at the time and also as a function of the location when the mobile device is connected to the network. In another example, an opportunity score may be derived via clustering and threshold-based techniques, where for example: Wi-Fi-access points with a particular frequency band (e.g., 5 GHz frequency band) at a given signal strength will have a better opportunity score than a lower frequency band (e.g., 2.4 GHz frequency band) access point due to the different throughputs they provide.

2. Compare Opportunity Scores to Identify Good Opportunity Networks

While mobile device 102 is connected to a network, opportunity learning engine 124 may compare one or more opportunity scores to determine whether the currently connected network is a good opportunity network. Opportunity learning engine 124 derives its intelligence to determine good or bad opportunities from the collected network data.

Network metrics logger 122 may detect that mobile device 102 is currently connected to a network. In an example, opportunity learning engine 124 identifies the SSID of the currently connected network and searches network database 128 for the SSID. Opportunity learning engine 124 and compares the opportunity score for the currently connected network identified by the SSID to opportunity scores for one or more other networks to which mobile device 102 has previously connected. In such an example, opportunity learning engine 124 may compare the opportunity score for the network to which mobile device 102 is currently connected to the opportunity score for other networks in order to determine whether the currently connected network is a good opportunity network.

In an example, the compared one or more opportunity scores may include an opportunity score for the current network connection and an opportunity score for one or more other networks to which mobile device 102 has previously connected. In essence, opportunity learning engine 124 compares the different values of the feature sets that classify different networks to which mobile device 102 has connected by using the opportunity scores for the different networks as a mechanism to determine whether a good or bad opportunity exists for synching mobile application data over the current network connection. From the values of the feature set that are collected for networks to which mobile device 102 is connected, opportunity learning engine 124 learns of good and bad opportunity networks that mobile device 102 may or may not use to sync mobile application data.

Opportunity learning engine 124 may determine, based on the comparison of the one or more opportunity scores, whether the current network connection is a good opportunity network for syncing mobile application data. In response to determining that the current network connection is a good opportunity network for syncing mobile application data, opportunity learning engine 124 may send a notification to synchronization manager 120 that the current network connection is a good opportunity network for syncing mobile application data. Opportunity learning engine 124 may send the notification to synchronization manager 120 so that it can leverage good network conditions for scheduling or performing data transfer (e.g., synching the application data).

In contrast, in response to determining that the current network connection is not a good opportunity network for syncing mobile application data, opportunity learning engine 124 may determine to not send a notification to synchronization manager 120 that the current network connection is a good opportunity network for syncing mobile application data. In another example, opportunity learning engine 124 may send a notification to synchronization manager 120 that the current network connection is not a good opportunity network for syncing mobile application data. As such, synchronization manager 120 may determine to not sync mobile application data over the current network connection and may delay any mobile application syncs over the current network connection.

A good opportunity may be based on, for example, instantaneous classification of good or available access point/cellular network state. For example, opportunity learning engine 124 may rely on a maximum received signal strength indication (RSSI) and a link speed for an access point that satisfies a threshold. In such an example, it may be unnecessary for opportunity learning engine 124 to rely on the connection history of mobile device 102 and may send a notification to synchronization manager 120 that the current network connection is a good opportunity network for syncing mobile application data.

In an example, opportunity learning engine 124 compares one or more opportunity scores including an opportunity score for the current network connection and a threshold opportunity score. If the opportunity score for the current network connection satisfies the threshold opportunity score, opportunity learning engine 124 may send a notification to synchronization manager 120 that the current network connection is a good opportunity network for syncing mobile application data. If the opportunity score for the current network connection does not satisfy the threshold opportunity score, opportunity learning engine 124 may want to delay the transfer of data over the current network connection and not send the notification to synchronization manager 120 that the current network connection is a good opportunity network for syncing mobile application data.

A good opportunity may be based on logging when a network interface is actually used and characterizing the performance obtained, or identifying relatively better opportunity compared to previous ones in a time period observed over time (e.g., a day). In an example, a good opportunity may be based on knowledge of "known" good opportunity access point and cellular connections from a previously stored history of network states. For example, opportunity learning engine 124 may leverage previous knowledge of a good access point. In an example, the user of mobile device 102 may shift between a home Wi-Fi network and a company Wi-Fi network. The company Wi-Fi network may be faster than the home Wi-Fi network. The data transfer may be faster over the company Wi-Fi network and may thus also expend less energy from mobile device 102 compared to using the home Wi-Fi network for synching application data.

In such an example, a first opportunity score for the company Wi-Fi network may indicate that it is a good opportunity network, and a second opportunity score for the home Wi-Fi network may indicate that it is a bad opportunity network. In another example, the first opportunity score for the company Wi-Fi network and the second opportunity score are the home Wi-Fi network may indicate that both the company and home Wi-Fi networks are good opportunity networks, but that the company Wi-Fi network is a better opportunity network compared to the home Wi-Fi network. In an example, the opportunity score for the company Wi-Fi network may indicate that the access point that connects mobile device 102 to the company Wi-Fi network is a better opportunity network (e.g., a faster network) compared to the opportunity score for the home Wi-Fi network.

Network metrics logger 122 may store first network data based on mobile device 102's connection to the company Wi-Fi network and may store second network data based on mobile device 102's connection to the home Wi-Fi network. Opportunity learning engine 124 may calculate an opportunity score for each of the company Wi-Fi network and home Wi-Fi network. In such an example, opportunity learning engine 124 leverages the network history knowledge across access points.

Opportunity learning engine 124 may compare one or more opportunity scores and speculate whether a network having a better opportunity score will be connected to mobile device 102 in the future. In an example, opportunity learning engine 124 compares a plurality of opportunity scores. Opportunity learning engine 124 may take into consideration how often mobile device 102 connects to particular networks. In an example, opportunity learning engine 124 determines whether a high probability exists that a better network over which to sync application data will be seen in the near future. Opportunity learning engine 124 may determine that a high probability exists that mobile device 102 will connect to the particular network within the threshold amount time and thus may determine to not send a notification to synchronization manager 120 that the current network connection is a good opportunity network for syncing mobile application data and/or may send a notification to synchronization manager 120 that the current network connection is not a good opportunity network for syncing mobile application data. Opportunity learning engine 124 may delay sending the notification to synchronization manager 120 that the current network connection is a good opportunity network for syncing mobile application data until mobile device 102 is connected to the particular network.

In an example, opportunity learning engine 124 may learn from the logged network data that mobile device 102 typically connects to the company Wi-Fi network during business hours on weekdays (e.g., Monday, Tuesday, Wednesday, Thursday, and Friday) and connects to the home Wi-Fi network on the weekends (e.g., Saturday and Sunday). In an example, if mobile device 102 is at the user's home on a Tuesday morning at 7:00 A.M., mobile device 102 may be connected to the home Wi-Fi network. Opportunity learning engine 124 may compare the opportunity score for the home Wi-Fi network with other opportunity scores for other networks and recognize that a better opportunity exists using the work Wi-Fi network for data transfer and that a high probability exists that mobile device 102 will be connected to the company Wi-Fi network in two hours at Tuesday 9:00 A.M. In such a scenario, opportunity learning engine 124 may want to delay the transfer of data over the current network connection and not send the notification to synchronization manager 120 that the current network connection is a good opportunity network for syncing mobile application data.

Accordingly, opportunity learning engine 124 may determine to not send a notification to synchronization manager 120 that the current network connection is a good opportunity network for syncing mobile application data and/or may send a notification to synchronization manager 120 that the current network connection is not a good opportunity network for syncing mobile application data. At a later point in time, opportunity learning engine 124 may recognize that mobile device 102 is currently connected to the company Wi-Fi network and determine, based on the compared opportunity scores, that the currently connected network is a good opportunity network. Accordingly, opportunity learning engine 124 may send a notification to synchronization manager 120 that the current network connection is a good opportunity network for syncing mobile application data.

The opportunity score for a network may factor in the likelihood that mobile device 102 will be connected to a particular network within a threshold amount of time (e.g., within four hours), where the particular network is a good opportunity network.

Opportunity learning engine 124 may distinguish between a data upload and a data download. A data upload may refer to data being sent from mobile device 102 to the remote computing device. A data download may refer to data being sent from the remote computing device to mobile device 102. Opportunity learning engine 124 may distinguish these two data transfers for synchronization manager 120 because the upload bandwidth may be capped or lower than the download bandwidth. As such, opportunities may be different for data upload and data download. To determine whether to send a notification to synchronization manager 120 that the current network connection is a good opportunity network for syncing mobile application data, opportunity learning engine 124 may factor in whether mobile device 102 will be uploading or downloading data to sync a mobile application.

Opportunity learning engine 124 may also take into consideration the state of mobile device 102. In an example, if mobile device 102 is charging, opportunity learning engine 124 may send a send a notification to synchronization manager 120 that the current network connection is a good opportunity network for syncing mobile application data. Opportunity learning engine 124 may send the notification even if the network is identified as a bad opportunity network for uploading mobile application data. For example, if mobile device 102 is connected to a network, the network may be a good opportunity network for downloading mobile application data but a bad opportunity network for uploading mobile application data. Opportunity learning engine 124 may determine a zero opportunity cost to sync the mobile application.

In another example, if mobile device 102's battery life is below a threshold battery life, opportunity learning engine 124 may want to delay the transfer of data over the current network connection to save battery power (even if the current network connection is identified as a good opportunity network). In such an example, opportunity learning engine 124 may send a notification to synchronization manager 120 to not sync mobile applications over the current network connection and/or send a notification to synchronization manager 120 that the current network connection is not a good opportunity network for syncing mobile application data. In this way, opportunity learning engine 124 may avoid mobile device 102 from consuming more power.

Although the opportunity learning engine 124 has been described as sending a notification to synchronization manager 120, it should also be understood that opportunity learning engine 124 may send the notification to one or more mobile applications installed on mobile device 102. Opportunity learning engine 124 may, for example, send the notification to only synchronization manager 120, to only one or more mobile applications installed on mobile device 102, or to both synchronization manager 120 and one or more mobile applications installed on mobile device 102.

III. Determine Whether to Sync the Mobile Application

Synchronization manager 120 may receive the notification from opportunity learning engine 124 and determine whether to sync the mobile application data. The notification may indicate that the current network connection is a good opportunity network or a bad opportunity for syncing mobile application data. Synchronization manager 120 may offer high-level data services or applications in an operating system.

Opportunity learning engine 124 may send the notification to synchronization manager 120 in a variety of ways. In an example, opportunity learning engine 124 notifies synchronization manager 120 of good opportunity networks via broadcast messages. Synchronization manager 120 may register to receive network hint broadcasts. In an example, mobile device 102 executes an Android® operating system and makes use of Android®'s "sendBroadcast(Intent Networkopportunity)" call to notify Android® services. In such an example, the Android® services may register to receive the broadcast intent using "registerReceiver(BroadcastReceiver, IntentFilter)". Upon receiving the broadcast message, services such as synchronization manager 120 may choose to initiate pending syncs and/or other data transfer activity to leverage good network conditions.

In response to a condition being satisfied, synchronization manager 120 may determine whether to sync the mobile application data. In an example, when the notification is received the condition is satisfied. Synchronization manager 120 may make the determination of whether to sync the mobile application data in response to, for example, receiving the notification from opportunity learning engine 124. In another example, when a period of time has elapsed the condition is satisfied. Synchronization manager 120 may periodically make the determination of whether to sync the mobile application data.

A. Do Not Sync the Mobile Application

After receiving the notification that the current network connection is a good opportunity network for syncing mobile application data, synchronization manager 120 may determine to not sync the mobile application data. In response to determining to not sync the mobile application data, synchronization manager 120 may do nothing further.

Synchronization manager 120 may determine to not sync application data of a mobile application if, for example, the mobile application already has a sync scheduled. In another example, if a mobile application already has a sync scheduled, synchronization manager 120 may determine to sync the mobile application data and reschedule the sync to be performed sooner.

B. Sync the Mobile Application

In response to determining to sync the mobile application data, synchronization manager 120 may send a message to the server associated with the mobile application or may send a message to the mobile application installed on mobile device 102 to initiate the mobile application data synching. Mobile application 104 or synchronization manager 120 may send a message to server 114 to initiate the mobile application data synching.

Synchronization manager 120 may schedule the syncing of mobile applications installed on mobile device 102. In some embodiments, data transmissions from applications are delayed and batched. Synchronization manager 120 may collect application data sync requests. In an example, synchronization manager 120 collectively syncs the mobile application data. Synchronization manager 120 may send a broadcast notification to the one or more mobile applications to be synced and/or the server associated with the one or more mobile applications to be synced to initiate the mobile application data synching. In an example, the notification is not broadcasted to all the mobile application installed on mobile device 102. In such an example, the notification may be sent to particular mobile applications based on some preferential behavior.

In some embodiments, synchronization manager 120 schedules the syncing of mobile applications based on a priority. Referring to FIG. 1, synchronization manager 120 may use a priority of mobile application 104 and a priority of mobile application 106 to determine which mobile application to synch before the other. For example, if mobile application 104 has a higher priority for synching than mobile application 106, synchronization manager 120 may schedule the sync of mobile application 104 with server 114 before the synch of mobile application 106 with server 116.

A priority may be assigned to a mobile application in a variety of ways. In an example, the user of mobile device 102 may assign a priority to a mobile application. In such an example, synchronization manager 120 may provide the user with a prompt requesting the user to indicate which mobile applications have a higher priority for synching compared to one or more other mobile applications installed on mobile device 102. In another example, synchronization manager 120 monitors the way in which the user of mobile device 102 engages with mobile applications 104 and 106 and assigns priorities to the mobile applications based on the monitoring. Synchronization manager 120 may assign a priority to a mobile application based on, for example, which mobile applications are the most frequency used, how much data on average has been transferred to the mobile application's associated server during a mobile application sync, or whether the mobile application is the most recently used mobile application.

In some embodiments, synchronization manager 120 schedules the syncing of mobile applications based on a time period elapsing. Synchronization manager 120 may identify a mobile application as being an application to periodically sync. In such an example, even if synchronization manager 120 does not receive a notification that the current network connection is a good opportunity network for syncing mobile application data of mobile application 104, synchronization manager 120 may nonetheless schedule the sync of mobile application 104.

In some embodiments, synchronization manager 120 may recognize whether the sync is for an upload or a download and accordingly issue opportunity notifications. Synchronization manager 120 may then schedule the data upload or data download based on the sync notification. In an example, these notifications are broadcast messages sent on shared memory channels between opportunity learning engine 124 and all service processes that have subscribed to the broadcast notification. Notifications may be triggered when, for example, opportunity learning engine 124 sees the "best" opportunity score for a network (based on previously seen opportunities), and wants to convey this knowledge to sync managers.

IV. User Inputs

In some embodiments, a user option may be added to opportunity learning engine 124 to override a determination made by opportunity learning engine 124. In an example, if opportunity learning engine 124 determines to send a notification that the current network is a good opportunity network for syncing mobile application data, opportunity learning engine 124 may provide the user with an option to override this determination. If the user overrides the determination, opportunity learning engine 124 may determine to not send the notification.

In another example, if opportunity learning engine 124 determines to not send a notification that the current network is a good opportunity network for syncing mobile application data, opportunity learning engine 124 may provide the user with an option to override this determination. If the user overrides the determination, opportunity learning engine 124 may send the notification. In another example, if opportunity learning engine 124 determines to send a notification that the current network is not a good opportunity network for syncing mobile application data, opportunity learning engine 124 may provide the user with an option to override this determination. If the user overrides the determination, opportunity learning engine 124 may send a notification that the current network is a good opportunity network for syncing mobile application data or may determine that no notification should be sent.

In an example, opportunity learning engine 124 may provide a prompt on a display of mobile device 104. The prompt may request whether a user of mobile device 102 desires to override the determination of whether the current network is a good opportunity network for syncing mobile application data. The determination may be that the current network is, for example, a good opportunity network or not a good opportunity network for syncing mobile application data.

In an example, opportunity learning engine 124 may receive a user input responsive to the prompt, the user input indicating that the user desires to override the determination that the current network is a good opportunity network for syncing mobile application data. In such an example, in response to the user input, opportunity learning engine 124 may determine to not send a notification that the current network is a good opportunity network for syncing mobile application data. In another example, opportunity learning engine 124 may receive a user input responsive to the prompt, the user input indicating that the user does not desire to override the determination that the current network is a good opportunity network for syncing mobile application data. In such an example, in response to the user input, opportunity learning engine 124 may send a notification that the current network is a good opportunity network for syncing mobile application data.

In another example, opportunity learning engine 124 may receive a user input responsive to the prompt, the user input indicating that the user desires to override the determination that the current network is not a good opportunity network for syncing mobile application data. In such an example, in response to the user input, opportunity learning engine 124 may send a notification that the current network is a good opportunity network for syncing mobile application data. In another example, opportunity learning engine 124 may receive a user input responsive to the prompt, the user input indicating that the user does not desire to override the determination that the current network is not a good opportunity network for syncing mobile application data. In such an example, in response to the user input, opportunity learning engine 124 may determine to not send a notification that the current network is a good opportunity network for syncing mobile application data.

Opportunity learning engine 124 may monitor the user's overrides to learn about what the user wants. In an example, the user's overrides may be an input into opportunity learning engine 124 so that it knows, for example, to not wait for the company Wi-Fi network on Saturdays and Sundays.

In some embodiments, a user option may be added to synchronization manager 120 to override a determination made by synchronization manager 120. In an example, if synchronization manager 120 determines that a mobile application data sync should be scheduled, before synchronization manager 120 actually schedules the mobile application data sync a user may be provided with an option to override the mobile application data sync. If the user overrides the determination, synchronization manager 120 may determine to not schedule the mobile application data sync.

In another example, if synchronization manager 120 determines that a mobile application data sync should not be scheduled, before synchronization manager 120 determines to not schedule the mobile application data sync the user may be provided with an option to override synchronization manager 120's this determination. For example, mobile device 102 may be low on battery and synchronization manager 120 may want to save battery power and thus may determine that the mobile application data sync should not take place. The user may override the synchronization manager 120's determination to not schedule the mobile application data sync and instruct synchronization manager 120 to schedule the mobile application data sync.

As discussed above and further emphasized here, FIGS. 1-2 are merely examples, which should not unduly limit the scope of the claims. For example, although mobile device 102 is described as being a mobile device, it should also be understood that in other embodiments mobile device 102 may be a stationary device.

V. Example Methods

Figure 3:
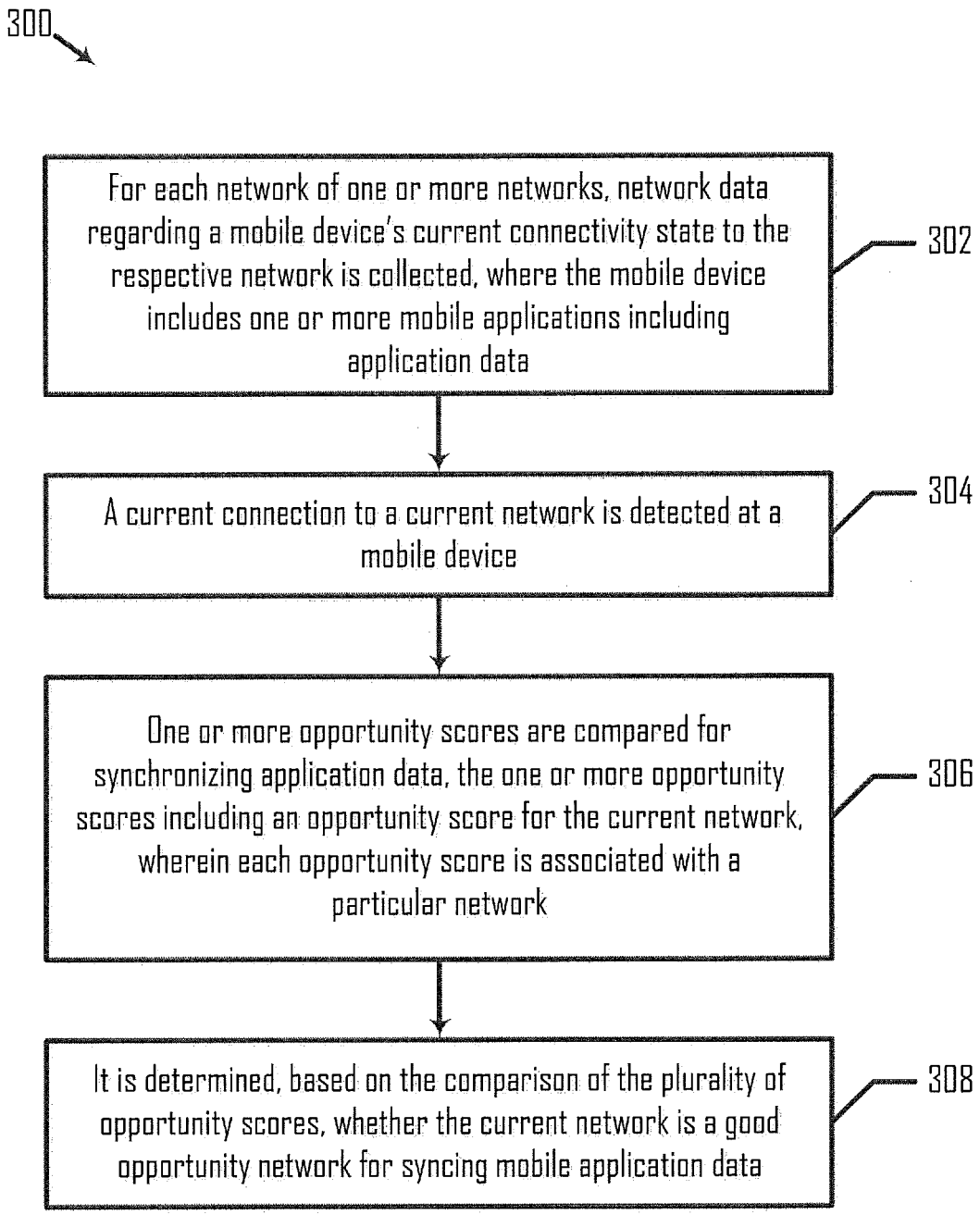
FIG. 3 is a flowchart illustrating a method of synchronizing application data between a mobile device and a remote computing device, according to some embodiments.

FIG. 3 is a flowchart illustrating a method 300 of synchronizing application data between a mobile device and a remote computing device, according to some embodiments. Method 300 is not meant to be limiting and may be used in other applications.

Method 300 includes blocks 302-308. In a block 302, for each network of one or more networks, network data is collected regarding a mobile device's current connectivity state to the respective network, where the mobile device includes one or more mobile applications including application data. In an example, for each network of one or more networks, network metrics logger 122 collects network data regarding mobile device 102's current connectivity state to the respective network, where mobile device 102 includes mobile applications 104 and 106, and each mobile application includes application data.

In a block 304, a current connection to a current network is detected at a mobile device. In an example, network metrics logger 122 detects a current connection to network 108 at mobile device 102.

In a block 306, one or more opportunity scores are compared for synchronizing application data, the one or more opportunity scores including an opportunity score for the current network, where each opportunity score is associated with a particular network. In an example, opportunity learning engine 124 compares one or more opportunity scores for synchronizing application data, the one or more opportunity scores including an opportunity score for the current network, and wherein each opportunity score is associated with a particular network.

In an example, the current network and a second network (previously connected to the mobile device) are of a common network type and have different feature set values for a feature set. Opportunity learning engine 124 may compare opportunity scores that are associated with the common network type (e.g., cellular network, Wi-Fi network, etc.). In an example, the one or more opportunity scores includes a first opportunity score and a second opportunity score that are associated with the common network type, and opportunity learning engine 124 compares the first and second opportunity scores to each other.

In another example, the current network is of a first type and a second network (previously connected to the mobile device) is of a second type that is different from the first type. Opportunity learning engine 124 may compare opportunity scores that are associated with the current network of the first type and the second network of the second type. In an example, the one or more opportunity scores includes a first opportunity score and a second opportunity score, where the first opportunity score is associated with the current network of the first type (e.g., cellular network) and the opportunity score is associated with the second network of the second type (e.g., Wi-Fi network). In such an example, opportunity learning engine 124 compares opportunity scores that are associated with different network types.

In a block 308, it is determined, based on the comparison of the one or more opportunity scores, whether the current network is a good opportunity network for syncing mobile application data. In an example, opportunity learning engine 124 determines, based on the comparison of the one or more opportunity scores, whether network 108 is a good opportunity network for syncing mobile application data.

It is also understood that additional processes may be performed before, during, or after blocks 302-308 discussed above. It is also understood that one or more of the blocks of method 300 described herein may be omitted, combined, or performed in a different sequence as desired.

Figure 4:
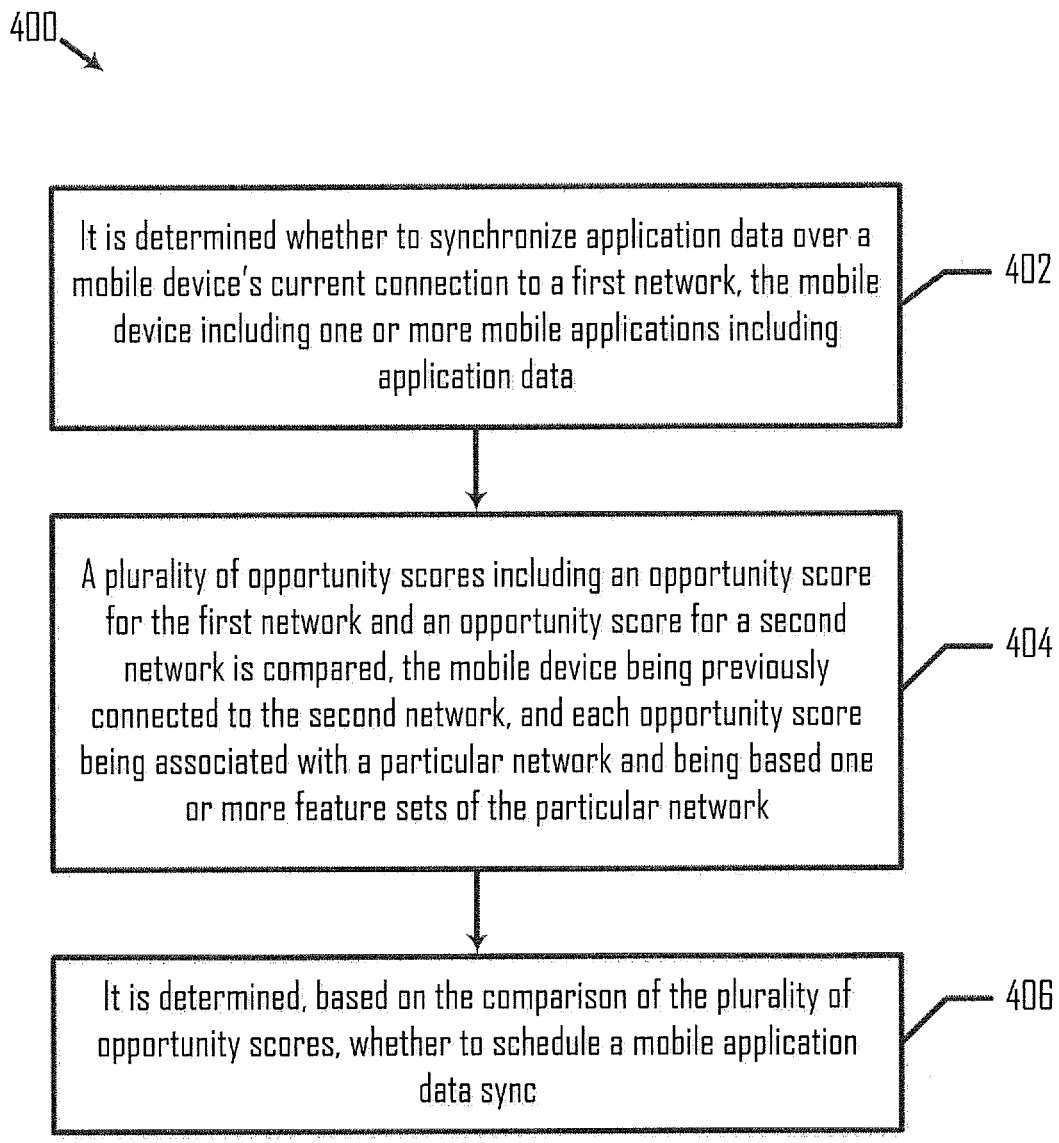
FIG. 4 is a flowchart illustrating a method of synchronizing application data between a mobile device and a remote computing device, according to some embodiments.

FIG. 4 is a flowchart illustrating a method 400 of synchronizing application data between a mobile device and a remote computing device, according to some embodiments. Method 400 is not meant to be limiting and may be used in other applications.

Method 400 includes blocks 402-406. In a block 402, it is determined whether to synchronize application data over a mobile device's current connection to a first network, the mobile device including one or more mobile applications including application data. In an example, synchronization manager 120 determines whether to synchronize application data over mobile device 102's current connection to a first network, mobile device 102 including mobile applications 104 and 106, each mobile application including application data.

In a block 404, a plurality of opportunity scores including an opportunity score for the first network and an opportunity score for a second network is compared, the mobile device being previously connected to the second network, and each opportunity score being associated with a particular network and being based one or more feature sets of the particular network. In an example, synchronization manager 120 compares a plurality of opportunity scores including an opportunity score for the first network and an opportunity score for a second network, mobile device 104 being previously connected to the second network, and each opportunity score being associated with a particular network and being based one or more feature sets of the particular network.

In an example, the first network is of a first type and the second network is of a second type that is different from the first type. In such an example, a first opportunity score that is associated with the first network of the first type and a second opportunity score that is associated with the second network of the second type may be compared. Accordingly, opportunity scores that are associated with different network types may be compared. In another example, the first network and the second network are of a common network type and have different feature set values for a feature set. In such an example, a first opportunity score and a second opportunity score that are associated with the common network type are compared. Accordingly, opportunity scores that are associated with the same network type may be compared.

In a block 406, it is determined, based on the comparison of the plurality of opportunity scores, whether to schedule a mobile application data sync. In an example, synchronization manager 120 determines, based on the comparison of the plurality of opportunity scores, whether to schedule a mobile application data sync.

It is also understood that additional processes may be performed before, during, or after blocks 402-406 discussed above. It is also understood that one or more of the blocks of method 400 described herein may be omitted, combined, or performed in a different sequence as desired.

VI. Example Computing System

Figure 5:
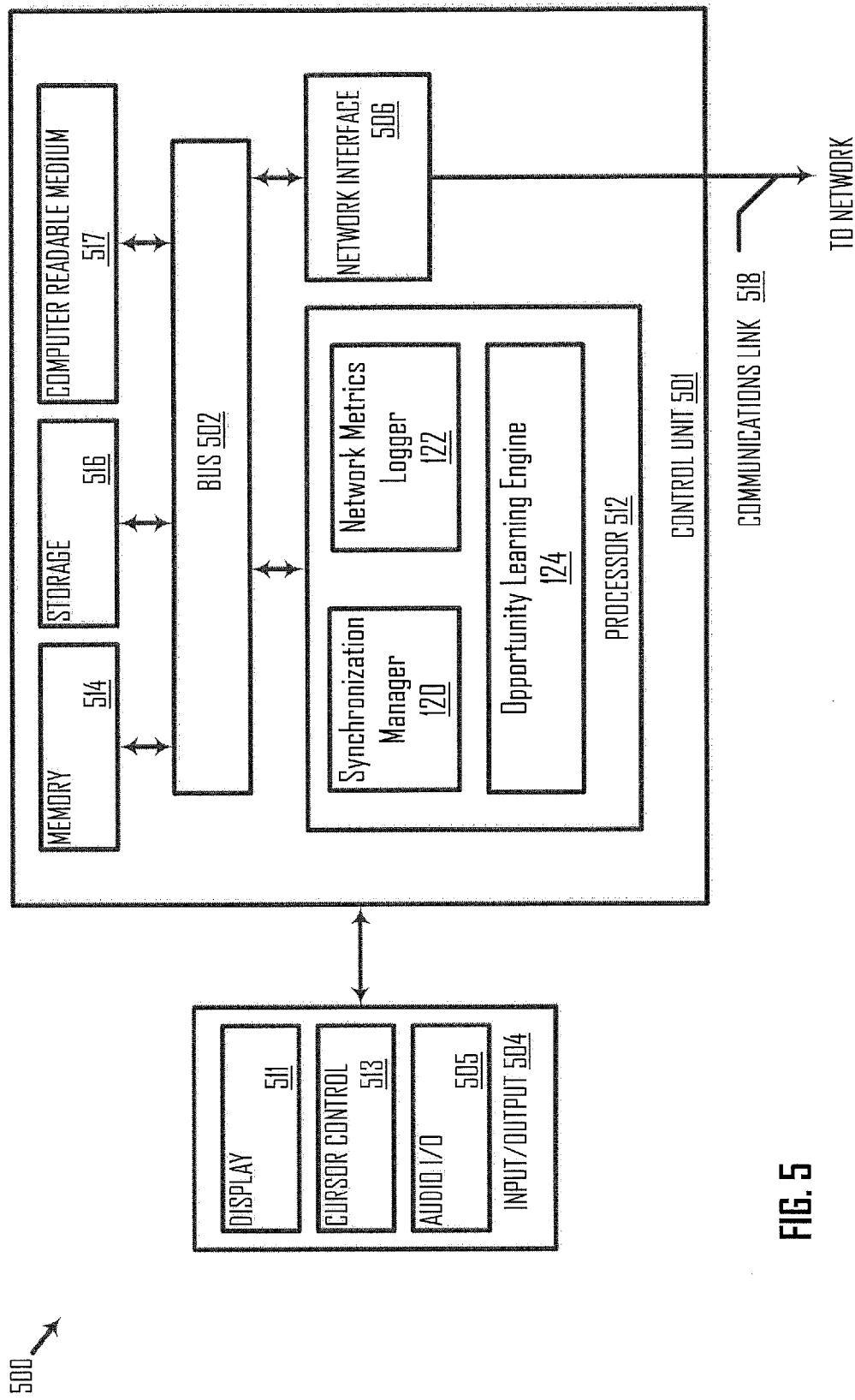
FIG. 5 is a block diagram of a computer system suitable for implementing one or more embodiments of the present disclosure.

FIG. 5 is a block diagram of an example computer system 500 suitable for implementing any of the embodiments disclosed herein. In various implementations, computer system 500 may be mobile device 102, server 114, or server 116. In FIG. 5, the computer system 500 includes a control unit 501 coupled to an input/output (I/O) component 504.

The computer system 500 may include one or more processors. The computer system 500 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include I/O component 504 for processing user actions, such as selecting keys from a keypad/keyboard, or selecting one or more buttons or links, etc., and sends a corresponding signal to bus 502. In an example, a user action may be a user input that overrides a determination made by opportunity learning engine 124 and/or synchronization manager 120.

I/O component 504 may also include an output component such as a display 511, and an input control such as a cursor control 513 (such as a keyboard, keypad, mouse, etc.). In an example, display 511 displays a prompt on display 511, the prompt requesting whether a user of mobile device 102 desires to override the determination of whether the current network is a good opportunity network for syncing mobile application data.

An audio I/O component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In some embodiments, the transmission is wireless, although other transmission mediums and methods may also be suitable.

A processor 512, which may be a micro-controller, digital signal processor (DSP), or other processing component, processes these various signals, such as for display on display 511 of computer system 500 or transmission to other devices via communication link 518. Network metrics logger 122, opportunity learning engine 124, and synchronization manager 120 may execute in processor 512. Processor 512 may also control transmission of information, such as cookies or IP addresses, to other devices.

Components of computer system 500 also include a system memory component 514 (e.g., RAM), a static storage component 516 (e.g., ROM), and/or a computer readable medium 517. Computer system 500 performs specific operations by processor 512 and other components by executing one or more sequences of instructions contained in system memory component 514. In an example, processor 512 processes instructions 302-308 according to FIG. 3 and/or processes instructions 402-406 according to FIG. 4.

Logic may be encoded in computer readable medium 517, which may refer to any medium that participates in providing instructions to processor 512 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 514, and transmission media includes coaxial cables, copper wire, and fiber optics, including wires that include bus 502. In some embodiments, the logic is encoded in computer readable medium 517. Computer readable medium 517 may be any apparatus that can contain, store, communication, propagate, or transport instructions that are used by or in connection with processor 512. Computer readable medium 517 may be an electronic, magnetic, optical, electromagnetic, infrared, or semiconductor device or a propagation medium, or any other memory chip or cartridge, or any other medium from which a computer is adapted to read. Further, transmission media may take the form of acoustic or light waves, such as those generated during radio wave, optical, and infrared data communications.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of synchronizing application data between a mobile device and a remote computing device, the method comprising:

for each network of one or more networks:
collecting network data regarding a mobile device's current connectivity state to the respective network, wherein the mobile device includes one or more mobile applications including application data; and
calculating, based on the network data, an opportunity score for the respective network;

detecting, at the mobile device, a current connection to a current network;

comparing one or more opportunity scores for synchronizing application data, the one or more opportunity scores including a first opportunity score for the current network and a second opportunity score for a second network that has been previously connected to the mobile device, wherein each opportunity score is associated with a particular network;

determining, based on the comparing, whether the current network is a good opportunity network for syncing mobile data; and in response to determining that the current network is a good opportunity network, sending a notification that the current network is a good opportunity network for syncing mobile application data.

2. The method of claim 1, wherein the collecting includes for each network of the one or more networks:

detecting, at the mobile device, a current connection to the respective network; and identifying a feature set in accordance with the respective network, the feature set including one or more metrics that characterizes the respective network, wherein the calculating includes calculating, based on the collected network data for the identified feature set, the opportunity score for the respective network.

3. The method of claim 2, wherein the calculating includes performing a regression analysis on the identified feature set.

4. The method of claim 1, wherein the collecting network data includes logging temporal data and spatial data regarding the mobile device's current connection.

5. The method of claim 1, further including:

for each network of the one or more networks, storing at the mobile device the opportunity score for the respective network.

6. The method of claim 1, wherein sending the notification includes sending to a synchronization manager the notification that the current network is a good opportunity network for syncing mobile application data.

7. The method of claim 6, further including:

in response to a condition being satisfied:

determining that application data of the one or more mobile applications over the current network should be synched; and synching application data of the one or more mobile applications over the current network.

8. The method of claim 7, wherein when the notification is received the condition is satisfied.

9. The method of claim 7, wherein when a period of time has elapsed the condition is satisfied.

10. The method of claim 1, further including:

prompting a user of the mobile device regarding whether to override a determination of whether the current network is a good opportunity network for syncing mobile application data.

11. The method of claim 10, further including:

receiving a user input responsive to the prompt, the user input indicating a desire to override a determination that the current network is a good opportunity network for syncing mobile application data; and in response to the user input, sending a message to a synchronization manager to discard the notification that the current network is a good opportunity network for syncing mobile application data.

12. The method of claim 10, further including:

receiving a user input responsive to the prompt, the user input indicating a desire not to override a determination that the current network is a good opportunity network for syncing mobile application data, wherein sending the notification includes in response to receiving the user input, sending the notification that the current network is a good opportunity network for syncing mobile application data.

13. The method of claim 10, further including:

receiving a user input responsive to the prompt, the user input indicating a desire to override a determination that the current network is not a good opportunity network for syncing mobile application data; and in response to the user input, sending the notification that the current network is a good opportunity network for syncing mobile application data.

14. The method of claim 10, further including:

receiving a user input responsive to the prompt, the user input indicating a desire not to override a determination that the current network is not a good opportunity network for syncing mobile application data.

15. The method of claim 1, wherein the first opportunity score and the second opportunity score of the one or more opportunity scores are associated with a common network type, and wherein the comparing includes comparing the first and second opportunity scores.

16. A system for synchronizing application data between a mobile device and a remote computing device, the system comprising:

a network metrics logger that detects a current connection between a mobile device and a current network, wherein for each network of one or more networks, the network metrics logger collects network data regarding a mobile device's current connectivity state to the respective network and calculates, based on the network data, an opportunity score for the respective network, and wherein the mobile device includes one or more mobile applications including application data; and an opportunity learning engine that compares one or more opportunity scores for synchronizing application data and determines, based on the comparing, whether the current network is a good opportunity network for syncing mobile application data, wherein the one or more opportunity scores includes a first opportunity score for the current network and a second opportunity score for a second network that has been previously connected to the mobile device, and each opportunity score is associated with a particular network, and wherein in response to determining that the current network is a good opportunity network, the opportunity learning engine sends a notification that the current network is a good opportunity network for syncing mobile application data.

17. The system of claim 16, wherein the current network is of a first type and the second network is of a second type that is different from the first type, and wherein the opportunity learning engine compares the first opportunity score that is associated with the current network of the first type and the second opportunity score that is associated with the second network of the second type.

18. The system of claim 16, wherein the current network and the second network are of a common network type and have different feature set values for a feature set, and wherein the opportunity learning engine compares opportunity scores that are associated with the common network type.

19. The system of claim 16, wherein for each network of the one or more networks, the network metrics logger stores at the mobile device the opportunity score for the respective network.

20. The system of claim 16, wherein for each network of the one or more networks, the network metrics logger detects, at the mobile device, a current connection to the respective network and identifies a feature set in accordance with the respective network, and calculates, based on the collected network data for the identified feature set, the opportunity score for the respective network, wherein the feature set includes one or more metrics that characterizes the respective network.

21. The system of claim 20, wherein the network metrics logger logs temporal data and spatial data on the mobile device's current connection.

22. The system of claim 16, wherein the opportunity learning engine sends to a synchronization manager the notification that the current network is a good opportunity network for syncing mobile application data.

23. A non-transitory computer-readable medium having stored thereon computer-executable instructions for performing operations, comprising:
   for each network of one or more networks;
      collecting network data regarding a mobile device's current connectivity state to the respective network, wherein the mobile device includes one or more mobile applications including application data; and
      calculating, based on the network data, an opportunity score for the respective network;
   detecting, at the mobile device, a current connection to a current network;
   comparing one or more opportunity scores for synchronizing application data, the one or more opportunity scores including a first opportunity score for the current network and a second opportunity score for a second network that has been previously connected to the mobile device, wherein each opportunity score is associated with a particular network;
   determining, based on the comparing, whether the current network is a good opportunity network for syncing mobile application data; and
   in response to determining that the current network is a good opportunity network, sending a notification that the current network is a good opportunity network for syncing mobile application data.

24. The computer-readable medium of claim 23, wherein each opportunity score of the one or more opportunity scores is based one or more feature sets of the particular network.

25. The computer-readable medium of claim 23,
   wherein sending the notification includes sending to a synchronization manager the notification that the current network is a good opportunity network for syncing mobile application data.

26. The computer-readable medium of claim 23, wherein the collecting network data includes logging temporal data and spatial data on the mobile device's current connection.

27. An apparatus for synchronizing application data between a mobile device and a remote computing device, the apparatus comprising:
   means for collecting, for each network of one or more networks, network data regarding a mobile device's current connectivity state to the respective network, wherein the mobile device includes one or more mobile applications including application data;
   means for calculating, for each network of the one or more networks, an opportunity score for the respective network, the opportunity score being based on the network data;
   means for detecting, at the mobile device, a network connection to a current network;
   means for comparing one or more opportunity scores for synchronizing application data, the one or more opportunity scores including a first opportunity score for the current network and a second opportunity score for a second network that has been previously connected to the mobile device, wherein each opportunity score is associated with a particular network;
   means for determining, based on the comparing, whether the current network is a good opportunity network for syncing mobile application data; and
   means for in response to determining that the current network is a good opportunity network, sending a notification that the current network is a good opportunity network for syncing mobile application data.

28. The apparatus of claim 27, wherein each opportunity score of the one or more opportunity scores is based one or more feature sets of the particular network.

29. The system of claim 16, wherein the opportunity learning engine prompts a user of the mobile device regarding whether to override a determination of whether the current network is a good opportunity network for syncing mobile application data and receives a user input responsive to the prompt,
   wherein if the user input indicates a desire to override a determination that the current network is a good opportunity network for syncing mobile application data, the opportunity learning engine sends a message to a synchronization manager to discard the notification that the current network is a good opportunity network for syncing mobile application data, and
   wherein if the user input indicates a desire not to override a determination that the current network is a good opportunity network for syncing mobile application data, the opportunity learning engine sends the notification to the synchronization manager that the current network is a good opportunity network for syncing mobile application data.

30. The method of claim 2, wherein the feature set abstracts one or more network types, and the first opportunity score and the second opportunity score are normalized into a single metric.

* * * * *